Patented June 20, 1933

1,914,891

UNITED STATES PATENT OFFICE

RAYMOND C. McALLISTER, OF PAINTED POST, NEW YORK, ASSIGNOR TO INGERSOLL-RAND COMPANY, OF JERSEY CITY, NEW JERSEY, A CORPORATION OF NEW JERSEY

SEALING DEVICE

Application filed February 12, 1931. Serial No. 515,353.

This invention relates to sealing devices, and has particular reference to sealing devices for the drive shaft of compressors and similar machines.

In the direct connected type of compressor the driving element, such as an electric motor, is usually located in close proximity to the compressor. With the motor located in such position, however, a suction is created along the drive shaft by reason of the motor acting as a fan and the oil used for lubricating the main bearings and other parts of the compressor is liable to be drawn in the form of a spray to the exterior of the compressor and to reach the driving motor.

If this condition is permitted it will be apparent that, in addition to causing wastage of lubricant, the lubricant which enters the motor will have an injurious effect upon the windings and other parts thereof.

The object of this invention therefore, is to prevent this suction of lubricant from a compressor or similar machine by sealing the opening in the compressor through which the drive shaft extends.

A further object is to prevent the lubricant from accumulating on the sealing device.

Other objects will be in part obvious and in part pointed out hereinafter.

Figure 1:
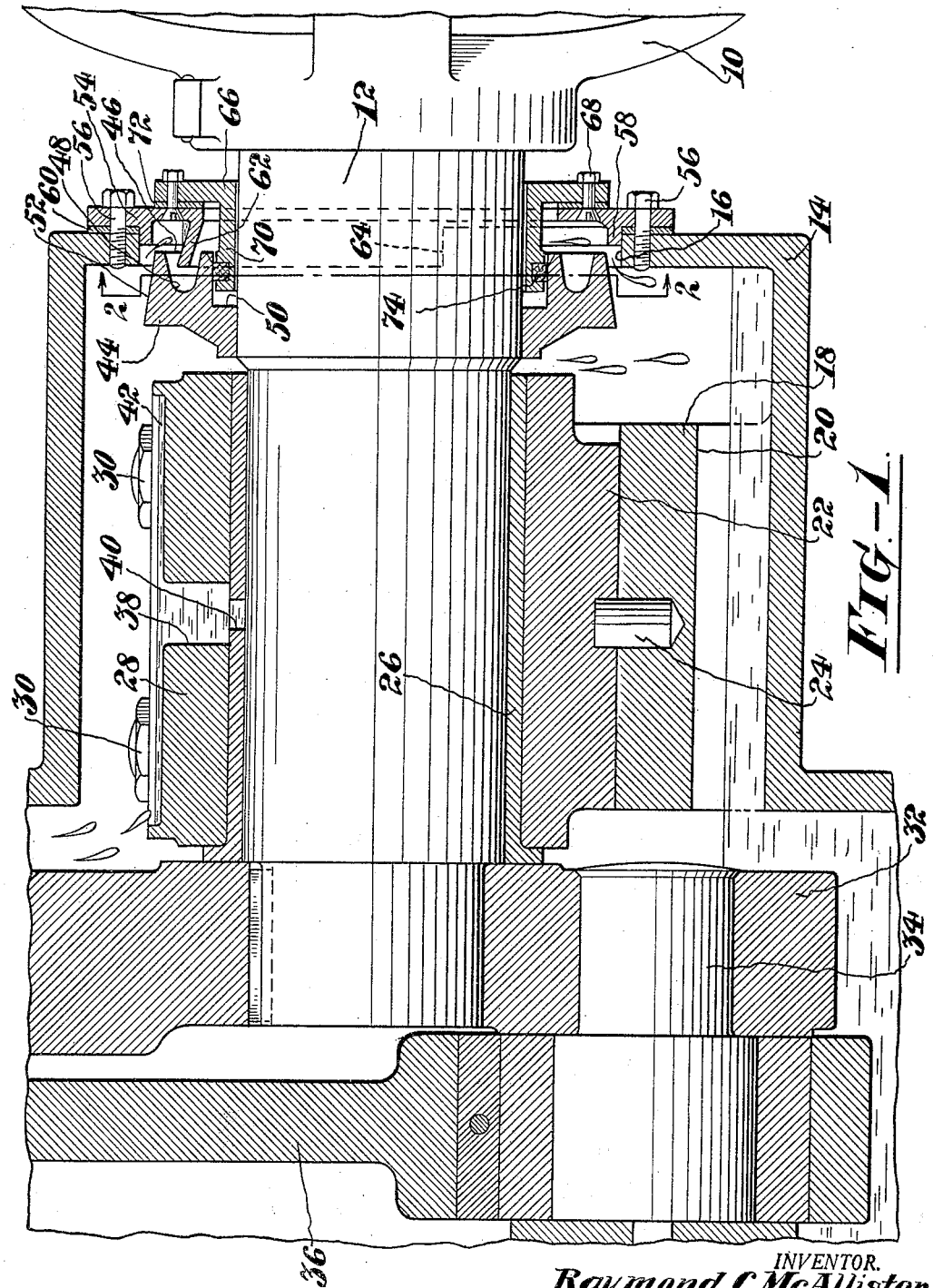
Figure 2:
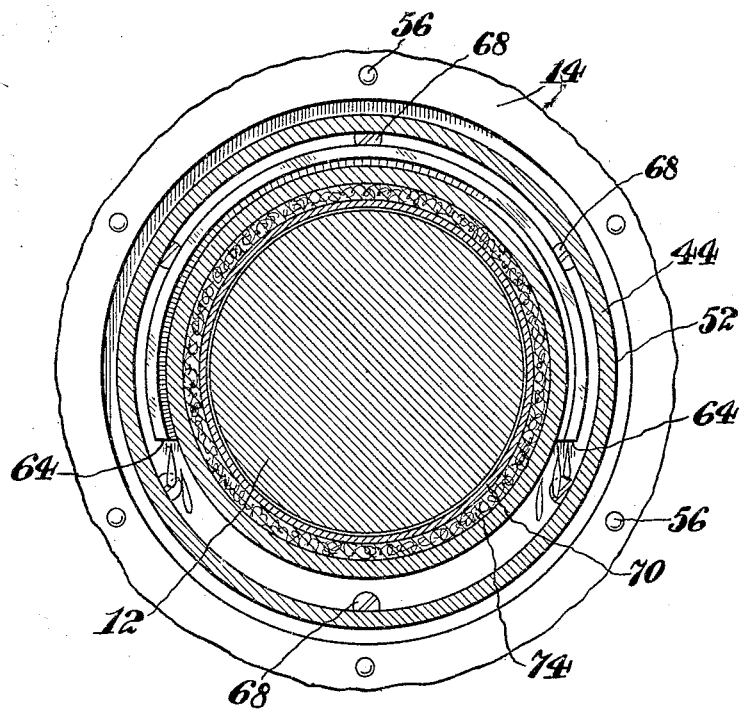

Referring to the drawings accompanying this specification and in which similar characters of reference designate corresponding parts throughout the several views, Figure 1 is a longitudinal sectional view of as much of a compressor as will suffice to illustrate the invention, and showing a portion of the driving motor connected thereto, and Figure 2 is a cross section taken on the line 2—2 of Figure 1.

Referring more particularly to the drawings, the numeral 10 designates a portion of the housing of a driving motor having a shaft 12, an extending portion of which may, as illustrated, extend into and form the drive shaft of a machine intended to be driven, as for instance, a compressor.

The compressor may be provided with the usual casing 14 forming a reservoir for lubricant and having an opening 16 in the side adjacent the motor to provide clearance for the drive shaft 12.

Suitable bearing means are provided for the drive shaft 12 and, in this instance, a bearing support 18 is formed integral with the casing and having a passage 20 therethrough for lubricant to pass from one side of the bearing support 18 to the other. A lower bearing section 22 is dowelled as at 24 to the bearing support 18 and a bushing 26 for the drive shaft 12 is partly supported by the lower bearing section 22. A bearing cap 28 is seated on the bushing 26 and is retained in position by the bolts 30.

On the end of the drive shaft 12 adjacent the bearing is a crank member 32 having a crank pin 34, projecting therefrom and having connected thereto a connecting rod 36, only a portion of which is shown.

The crank 32 is adapted to be partly submerged in the lubricant contained within the reservoir at each revolution of the crank. In this manner lubricant is splashed to the various parts of the compressor requiring lubrication. Lubricant is conveyed to the cooperating surfaces of the drive shaft and the bushing by apertures 38 and 40, in the bearing cap 28 and the bushing 26 respectively, to permit lubricant from the reservoir to be carried through the agency of the crank to the drive shaft 12. In addition, a trough 42 may be formed in the bearing cap to collect lubricant and thus assure an ample supply to the apertures 38 and 40.

In accordance with this invention the lubricant carried from the reservoir by the crank is prevented from being drawn in the form of a spray to the outside of the compressor through the opening 16 by the suction created by the driving motor 10. To this end, an oil ring 44 is secured to the shaft 12, as by press fitting. The ring 44 may be so located that one end 46 thereof extends into the opening 16.

The face 46 of the oil ring 44 is provided with a circular groove 48 and in this same face a recess 50 is formed. It will be apparent that lubricant splashed in the direction of the opening will impinge upon the oil ring 44 and, as this member rotates with the drive shaft 12, the major portion of this lubricant will be thrown against the casing 14 to again return to the reservoir.

A portion of the lubricant may, however, remain upon the outer periphery 52 of the oil ring and means are provided to collect this lubricant and prevent its emergence from the compressor. Accordingly, the outer periphery 52 of the oil ring 44 is tapered toward the opening 16 so that the lubricant will flow in this one direction only.

Cooperating with the oil ring 44 are a pair of sealing plates, the inner plate 54 of which is secured as by the bolts 56 to the casing. A portion 58 of the sealing plate 54 may project into the opening 16 and a gasket 60 is interposed between the plate 54 and the casing 14 to insure a fluid tight joint between these members.

In order to collect the lubricant flowing from the periphery of the oil ring 44, the inner sealing plate 54 is provided with an inclined lateral flange 62 extending partly around the plate and preferably projecting into the groove 48 of the oil ring 44. The ends 64 of this flange 62 preferably terminate below the center of the plate as shown in Figure 2 and it will be apparent that by reason of the inclined formation of the flange 62 an open ended trough will be provided which will lead the lubricant which passes beyond the oil ring back to the reservoir.

The outer sealing plate 66 is adapted to receive such lubricant as may pass beyond the inner sealing plate 54 and prevent such lubricant from reaching the shaft 12 and being drawn to the outside of the compressor. The outer sealing plate 66 is therefore secured as by bolts 68 to the inner sealing plate 54 and has an annular flange 70 extending laterally along the drive shaft 12 and slightly spaced therefrom.

A liquid tight seal is provided between the inner and outer sealing plates by means of the gasket 72. The flange 70 of the outer sealing plate 66 preferably extends into the recessed portion 50 of the oil ring 44 and is provided with a packing ring 74, of felt, or other suitable absorbent material, which will frictionally engage the surface of the recessed portion 50 and effectively prevent leakage of lubricant between the adjacent surfaces of these elements.

During the operation of the compressor a portion of the lubricant in the reservoir will, as hereinbefore stated, be carried upwardly by the crank and then fall by gravity around the bearing of the drive shaft 12. A portion of this lubricant will be splashed towards the opening 16, but the major portion of this lubricant will be intercepted by the oil ring 44 and be flung therefrom by centrifugal force. Any lubricant which collects upon the oil ring will flow along the tapered periphery thereof and into the channel formed by the inclined flange 62 of the sealing ring 54. The lubricant thus collected in the channel will flow therearound and drop from the ends 64 of the flange and return through the opening 20 in the bearing support 18 to the reservoir.

It will be apparent that little, if any, lubricant will reach the packing ring 74 by passing the outer sealing plate 66 and the oil ring 44, but should any oil reach the packing member 74, it will be effectively prevented thereby from reaching the drive shaft 12.

It will be apparent from the foregoing that a plurality of lubricant collecting surfaces have been provided and that these surfaces are so constructed and arranged that lubricant collected thereon will be quickly returned to the reservoir. It will also be apparent that an effective sealing device has been provided to prevent any lubricant from being drawn to the exterior of the compressor by the action of the driving motor.

I claim:

1. A sealing device for compressors and the like, comprising a casing having a reservoir for lubricant and an opening at one end, a shaft extending through the opening into the casing, a plurality of fixed and movable members on the shaft and casing having laterally extending overlapping portions to intercept lubricant passing towards the opening and lead it back to the reservoir, and a packing member carried by a fixed member and lying within the laterally extending portion of a movable member and seating thereagainst to seal the opening in the casing.

2. A sealing device for compressors and the like, comprising a casing having a reservoir for lubricant, a shaft extending into the casing, an oil ring mounted on the shaft, a sealing plate secured to the casing adjacent the oil ring, an inclined flange extending partly around the sealing plate and projecting laterally therefrom to form an open ended trough to lead the lubricant which passes beyond the oil ring back to the reservoir, a second sealing plate secured to the first, and a packing member on the second sealing plate bearing against the oil ring between the inclined flange and the shaft to prevent lubricant from the trough from passing along the shaft.

3. A sealing device for compressors and the like, comprising a casing having a reservoir for lubricant, a shaft extending into the casing, an oil ring mounted on the shaft and having an annular groove in one face, a sealing plate secured to the casing adjacent the oil ring, an inclined flange extending partly around the sealing plate and projecting laterally therefrom into the groove to form an open ended trough to lead the lubricant which passes beyond the oil ring back to the reservoir, a second sealing plate secured to the first, and a packing member on the second sealing plate bearing against the oil ring between the inclined flange and the shaft to prevent lubricant from the trough from passing along the shaft.

4. A sealing device for compressors and the like, comprising a casing having a reservoir for lubricant, a shaft extending into the casing, an oil ring mounted on the shaft and having an annular groove in one face and a recessed portion spaced from the shaft, a sealing plate secured to the casing adjacent the oil ring, an inclined flange extending partly around the sealing plate and projecting laterally therefrom into the groove to form an open ended trough to lead the lubricant which passes beyond the oil ring back to the reservoir, a second sealing plate secured to the first and having a lateral annular flange extending therefrom along the shaft and into the recessed portion of the oil ring, and a packing member on the last named flange bearing against the wall of the recessed portion of the oil ring between the inclined flange and the shaft to prevent lubricant from the trough from passing along the shaft.

In testimony whereof I have signed this specification.

RAYMOND C. McALLISTER.